US008423883B1

(12) United States Patent
Stöckmann

(10) Patent No.: US 8,423,883 B1
(45) Date of Patent: Apr. 16, 2013

(54) SYSTEMS AND METHODS OF CREATING AND EDITING ELECTRONIC CONTENT INCLUDING MULTIPLE TYPES OF GRAPHICS

(75) Inventor: Klaas Stöckmann, Hamberg (DE)

(73) Assignee: Adobe Systems Incorporated, San Jose, CA (US)

(*) Notice: Subject to any disclaimer, the term of this patent is extended or adjusted under 35 U.S.C. 154(b) by 398 days.

(21) Appl. No.: 12/557,615

(22) Filed: Sep. 11, 2009

(51) Int. Cl.
*G06F 17/00* (2006.01)
*G09G 5/00* (2006.01)

(52) U.S. Cl.
USPC ........... 715/211; 715/205; 715/243; 715/255; 715/815; 345/549; 345/619

(58) Field of Classification Search .................. 715/200, 715/201, 210, FOR. 183, FOR. 184, 204, 715/205, 211, 234, 243, 255, 273, 700, 800, 715/801, 815; 345/156, 157, 214, 418, 428, 345/501, 522, 581, 582, 592, 594, 603, 604, 345/625, 634, 661, 215, 24, 472, 619, 621, 345/636, 650, 660, 676
See application file for complete search history.

(56) References Cited

U.S. PATENT DOCUMENTS

| | | | | |
|---|---|---|---|---|
| 6,377,276 | B1 * | 4/2002 | Ludtke | 345/620 |
| 7,423,655 | B1 * | 9/2008 | Stephens | 345/624 |
| 7,453,474 | B2 * | 11/2008 | Faraday et al. | 345/660 |
| 7,468,731 | B2 * | 12/2008 | Eldridge et al. | 345/581 |
| 7,702,409 | B2 * | 4/2010 | Lucas et al. | 700/96 |
| 2005/0104894 | A1 * | 5/2005 | Sanborn et al. | 345/592 |
| 2005/0146533 | A1 * | 7/2005 | Sanborn et al. | 345/611 |
| 2006/0005114 | A1 * | 1/2006 | Williamson et al. | 715/502 |
| 2007/0061744 | A1 * | 3/2007 | Smith et al. | 715/763 |
| 2007/0139441 | A1 * | 6/2007 | Lucas et al. | 345/619 |
| 2007/0200873 | A1 * | 8/2007 | Hsu | 345/629 |

OTHER PUBLICATIONS

"ACD Systems International Online Store—Canvas 11", http://store.acdsee.com/store/acd/en_US/DisplayProductDetailsPage/productID.78702300?resid=U2 . . . downloaded from the Internet on Sep. 2, 2009.

* cited by examiner

*Primary Examiner* — Maikhanh Nguyen
(74) *Attorney, Agent, or Firm* — Kilpatrick Townsend & Stockton LLP

(57) ABSTRACT

Systems and methods for creating and editing content having graphics of different types. For example, bitmap-based image editing can be integrated within a vector-editing application allowing bitmap images to be edited within the context of the content in which they are used. Bitmap specific editing features can be made available concurrently with outer editing environment editing features. For example, a bitmap container used in an outer application may be cropped or resized while the outer editing application is in a specific bitmap editing mode that also allows editing of the actual pixels of the bitmap (e.g., to set the colors of the pixels and the pixel resolution). An editing application may also provide an integrated scale pixels to screen option to allow editors to selectively keep or discard image details (e.g., resolution information that is not needed for an images current size, etc.).

17 Claims, 8 Drawing Sheets

SYSTEMS AND METHODS OF CREATING AND EDITING ELECTRONIC CONTENT INCLUDING MULTIPLE TYPES OF GRAPHICS

FIELD

This disclosure generally relates to computer software that creates, edits, runs, displays, provides, or otherwise uses electronic content.

BACKGROUND

Electronic content can be created and edited by various content editing applications. In many circumstances, content that is created using such applications includes objects or other parts that are of differing types. For example, a piece of content may include both vector graphics and bitmap graphics. Some photo editing and bitmap editing applications allow the editing of vector graphics but restrict such use to only on vector layers of a multi-layer piece of content. In such cases, although the application can be used to edit both bitmap and vector graphics, the application requires that each whole layer is either bitmap or vector and not a combination of both.

More generally, the use of multiple types of graphics within a piece of content often requires launching separate editing tools to allow editing of the different types of graphics. For example, many content editing applications, including many vector graphics based editing applications, launch external applications for bitmap editing. A vector graphics editing application may allow the inclusion of a bitmap graphic on an editing canvas and allow high-level adjustments (e.g., size, scale, adjustments, etc.) of the bitmap object, but require launching a separate application to edit the actual pixels of the bitmap (e.g., to set the colors of the pixels and the pixel resolution). Launching a separate application to edit such a bitmap can have numerous drawbacks including, but not limited to, preventing the bitmap from being edited in the context of the other objects with which it is being used. Similarly, transformations and other high-level changes made to the bitmap in the outer editing application may get disabled when entering a bitmap-editing mode. Generally, editing applications that allow bitmap editing often offer only a limited set of editing tools and can remove the image from the global document context when switching to the bitmap-editing mode.

SUMMARY

Systems and methods are disclosed for creating and editing content having graphics of different types. For example, bitmap based image editing can be integrated within a vector editing application allowing bitmap images to be edited within the context of the content in which they are used. Bitmap specific editing features can be made available concurrently with outer editing environment editing features. For example, a bitmap container used in an outer application may be cropped or resized while the outer editing application is in a specific bitmap editing mode that also allows editing of the actual pixels of the bitmap (e.g., to set the colors of the pixels and the pixel resolution). An editing application may also provide an integrated scale pixels to screen option to allow editors to selectively keep or discard image details (e.g., resolution information that is not needed for an images current size, etc.).

One exemplary embodiment comprises a method providing an application for editing computer content comprising graphics, wherein the application provides a user interface comprising a canvas for displaying the content being edited and presenting on the canvas a vector graphic and a bitmap container, the bitmap container comprising a bitmap that is at least partially displayed in a position relative to the canvas and based on the bitmap container's position. This exemplary method further comprises, in response to receiving a command or other input to edit the bitmap, presenting an interface for editing the bitmap in the position relative to the canvas. The displayed canvas can still display the vector graphic and any other objects to provide context for editing the bitmap. Transformation and/or filters applied to the bitmap container can be maintained or temporarily removed while the interface for editing the bitmap is presented, i.e., the editing application is in bitmap editing mode. While the interface for editing the bitmap is presented, i.e., the user interface may allow, restrict, or prevent editing of non-bitmap objects depending on the circumstances. For example, it may allow transformations to the bitmap container associated with the bitmap being edited but not to other objects.

These exemplary embodiments are mentioned not to limit or define the disclosure, but to provide examples of embodiments to aid understanding thereof. Embodiments are discussed in the Detailed Description, and further description is provided there. Advantages offered by the various embodiments may be further understood by examining this specification.

BRIEF DESCRIPTION OF THE FIGURES

These and other features, aspects, and advantages of the present disclosure are better understood when the following Detailed Description is read with reference to the accompanying drawings, wherein.

DETAILED DESCRIPTION

Figure 1:
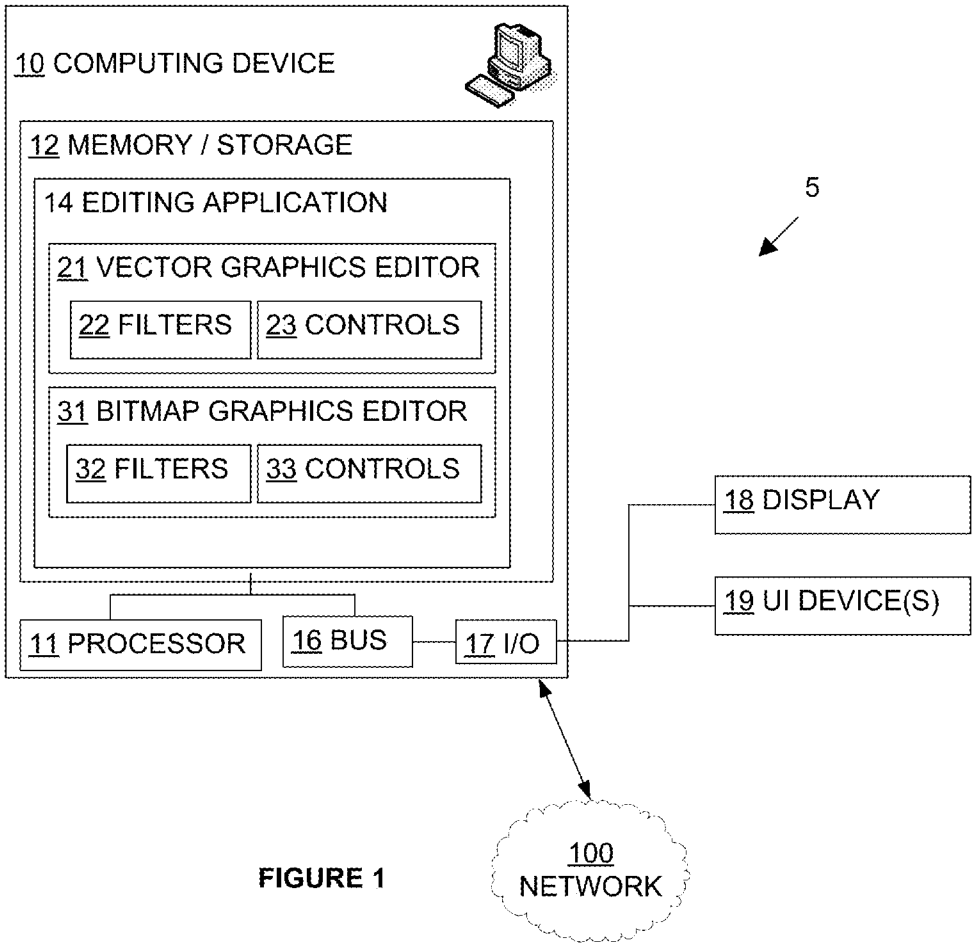
FIG. 1 is a system diagram illustrating an illustrative network environment, according to certain embodiments.

In certain embodiments, an electronic content editing application is configured to allow the inclusion and editing of various vector-based graphics, such as shapes, text boxes, etc. as well as bitmap objects. Such a vector-based graphics editing application can provide a bitmap editing mode that allows a selected bitmap in the content to be edited directly within the application and without having to launch a separate editing application.

Bitmaps can be included in a vector-based graphics editing application in a variety of ways. In one embodiment, the editing application allows the use of bitmap container objects that behave like other vector objects. Common vector operations and filters can be applied to each bitmap container. Accordingly, when a bitmap container overlaps another bitmap container or vector graphic, the overlap will appear in accordance with the editing application's normal rules for overlapping vectors. Similarly, a filter can be applied to a bitmap container to achieve results like those achieved when the filter is applied to vector graphics objects in the editing application. Thus, if a bitmap container includes a bitmap graphic and a transparent area, overlap and filter features will apply to the transparent areas as well as the bitmap graphic.

A separate bitmap editing mode is provided for editing the bitmap graphic itself. For example, a double-click on a bitmap container can switch the application into the bitmap editing mode in which a bitmap editing area is displayed that shows the bitmap in the same context as the outer editing application. A bitmap editing tool menu may be displayed offering the default and custom bitmap editing tools.

To preserve the editing context, the bitmap container can keep the same position on an editing application's editing canvas when switching into the bitmap-editing mode. Any transformations applied to the bitmap container can thus still be displayed. For example, if the bitmap container is rotated, the bitmap editing mode can maintain that rotation so that the user actually edits a rotated view of the bitmap image. Filters applied to the bitmap container in vector-editing mode can be, but need not be, disabled while in bitmap-editing mode to facilitate the user's ability to edit the actual bitmap content. If one or more of the bitmap container filters are disabled in bitmap editing mode, such filters can be reapplied when switching back into the outer, vector editing mode.

Additionally or alternatively, editing of outer application objects can be partially or entirely restricted while the editing application is in bitmap editing mode. However, it is generally preferable to have other objects remain visible to conserve the context of the global content being edited. Empty areas within the bitmap can be filled with a pattern (such as a checkerboard pattern) to provide a visual indication of the size and boundaries of the bitmap editing area.

Various embodiments further address the scaling or resizing of a bitmap within a vector editing environment. For example, if a bitmap container is scaled in a way that an interpolation of the bitmap is required, an option can be provided offering to perform the interpolation on the bitmap content in respect to the new container size. Similarly, when resizing a bitmap object makes it possible to drop unnecessary resolution information, the editing environment can, automatically or based on user input, determine that such information should or should not be dropped.

These illustrative examples are given to introduce the reader to the general subject matter discussed herein and are not intended to limit the scope of the disclosed concepts. The following sections describe various additional embodiments and examples.

Illustrative Computing Environment

Referring now to the drawings in which like numerals indicate like elements throughout the several Figures, FIG. 1 is a system diagram illustrating an illustrative computing environment 5 according to certain embodiments. Other embodiments may be utilized. The computing environment 5 shown in FIG. 1 comprises a computing device 10 that is connected to a wired or wireless network 100. Exemplary applications that execute on the computing device 10 are shown as functional or storage components residing in memory 12. The memory 12 may be transient or persistent. As is known to one of skill in the art, such applications may be resident in any suitable computer-readable medium and execute on any suitable processor. For example, the computing device 10 may comprise a computer-readable medium such as a random access memory (RAM) coupled to a processor 11 that executes computer-executable program instructions and/or accesses information stored in memory 12. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The network 100 shown comprises the Internet. In other embodiments, other networks, intranets, combinations of networks, or no network may be used. The computing device 10 may also comprise a number of external or internal devices such as a mouse, a CD-ROM, DVD, a keyboard, a display, audio speakers, or other input or output devices. For example, the computing device 10 includes input output connections 17, connecting a display 18 and various user interface devices 19. The computer device 10, depicted as a single computer system, may be implemented as a network of computers, servers, or processors. Examples of a server device are servers, mainframe computers, networked computers, a processor-based device, and similar types of systems and devices.

A computing device, such as exemplary computing device 10, can utilize various functional components to implement one or more of the features described herein. Computing device 10 has an editing application 14 that includes a vector graphics editor component 21 for editing vector graphics components and a bitmap graphics editor component 31 for editing bitmaps. The editing application 14 may present a user interface that allows a user to edit both vector graphics and bitmap graphics in the same editing canvas using either the vector graphics editor 21 or the bitmap graphic editor 21. Both the vector graphics editor 21 or the bitmap graphic editor 21 may allow a user to use filters 22, 32, and various editing controls 23, 33, respectively. Some or all of the vector filters 22 may have corresponding or similar graphics filters 32. Similarly, some or all of the vector controls 23 may have corresponding or similar graphics controls 33. The similarities can simplify a user's editing experience and provide other benefits.

This illustrative computing environment 5 is provided merely to illustrate a potential environment that can be used to implement certain embodiments. Other computing devices and configurations may alternatively or additionally be utilized.

Exemplary Methods of Providing an Editing Application for Editing Vector and Bitmap Graphics Embodiments facilitate editing different media types in a single document, for example, editing bitmap graphics and vector graphics together. In one exemplary embodiment an editing application provides a canvas for positioning and editing vector graphics objects. The editing application can allow bitmap graphics to be used on the editing canvas in a variety of ways. For example, the editing application may facilitate the creation and use of a bitmap container object to be defined like a vector graphic but that includes one or more bitmap graphics. In an exemplary editing application, a bitmap container can be treated the same as a vector object with respect to transformations, filters, and/or other editing features normally used with vector objects. The bitmap container can, however, also be selected to enter a bitmap editing mode for editing the one or more layers of a bitmap or bitmaps.

Figure 2A:
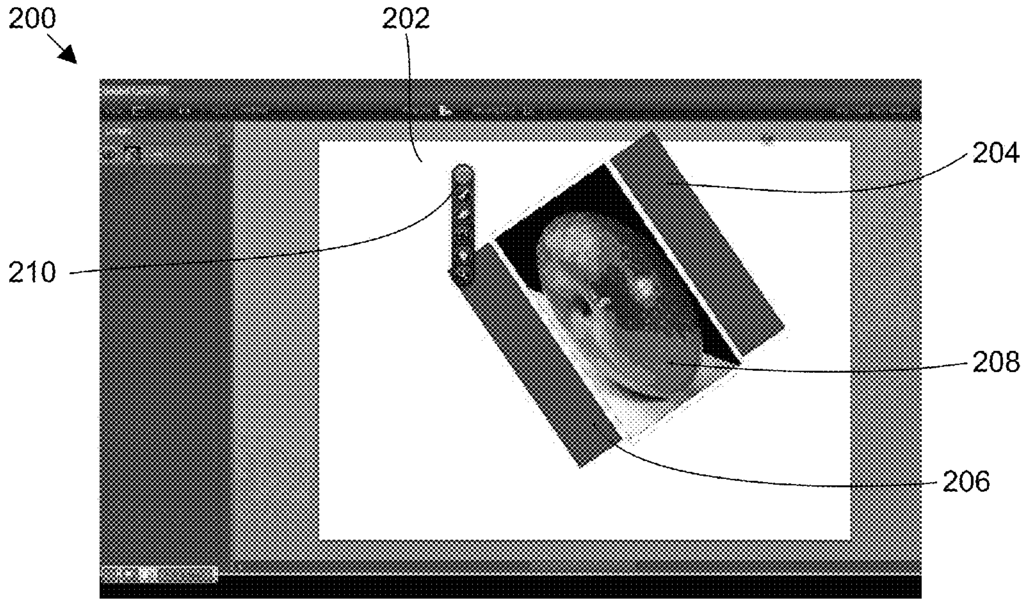
FIGS. 2A-B are screen shots illustrating an exemplary user interface of a vector graphic editing application, according to certain embodiments.
Figure 2B:
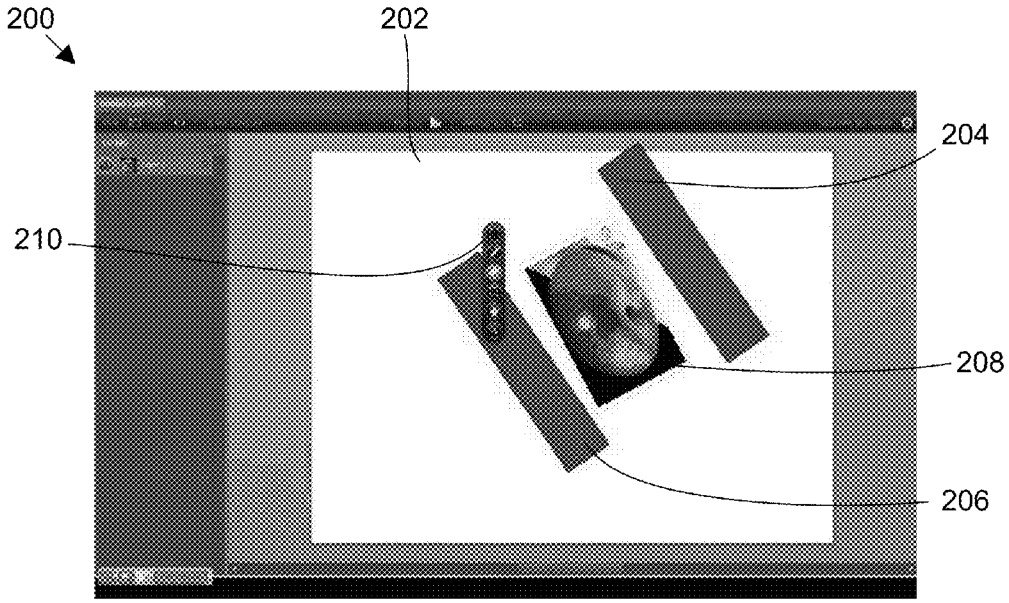

FIGS. 2A-B are screen shots illustrating an exemplary user interface 200 of a vector graphic editing application. The user interface presents an editing canvas 202 for creating content that can include both bitmap and vector graphics. In the example depicted, the content comprises two vector graphics 204, 206 that a user positioned and configured on the editing canvas 202. A bitmap container 208 is also positioned on the user interface 202. In this example, a user interacts with the user interface 202 to reposition and resize the bitmap container 208 from FIG. 2A to FIG. 2B.

An editing application can provide robust bitmap editing interface directly within an outer vector graphic editing context. In one embodiment, the editing application provides a specific bitmap editing mode for editing one or more bitmap objects. An editing application can provide a bitmap editing interface that preserves the visual correlation to other objects or portions of the content. For example, when entering a bitmap editing mode the to-be-edited bitmap need not be resized or expanded in a separate editing window and can be presented without losing its vector level translations (rotation and scaling). For example, an application may allow a user to enter a bitmap editing mode to edit a bitmap of the bitmap container 208 directly within the bitmap container as it is displayed on the editing canvas 202. Examples of affine and other transformations include, but are not limited to, rotation, change in size, and change in scale. With respect to the outer environment, among other things a user can also benefit from in-context bitmap editing by being able to see which direction it is appropriate to expand or contract a bitmap. A user can see that the other graphics or objects that are displayed in the content.

Figure 3A:
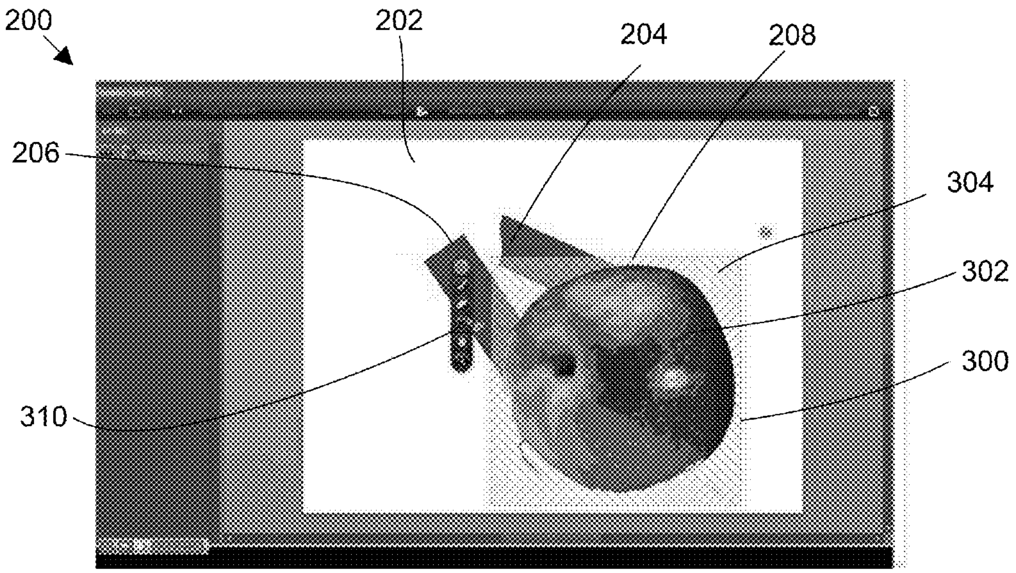
FIGS. 3A-C are screen shots illustrating the exemplary user interface of the vector graphic editing application of FIGS. 2A-B in a bitmap editing mode, according to certain embodiments.
Figure 3B:
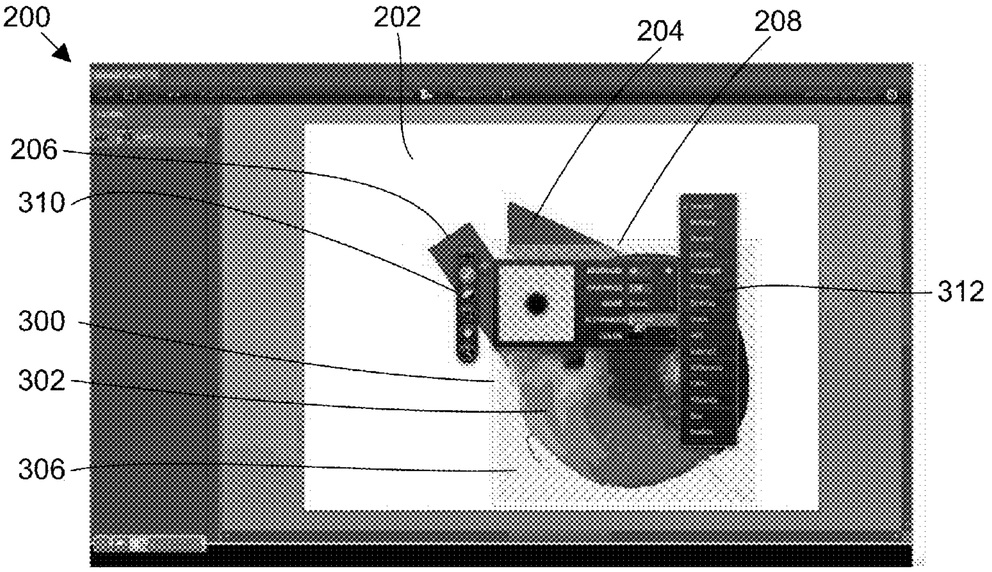
Figure 3C:
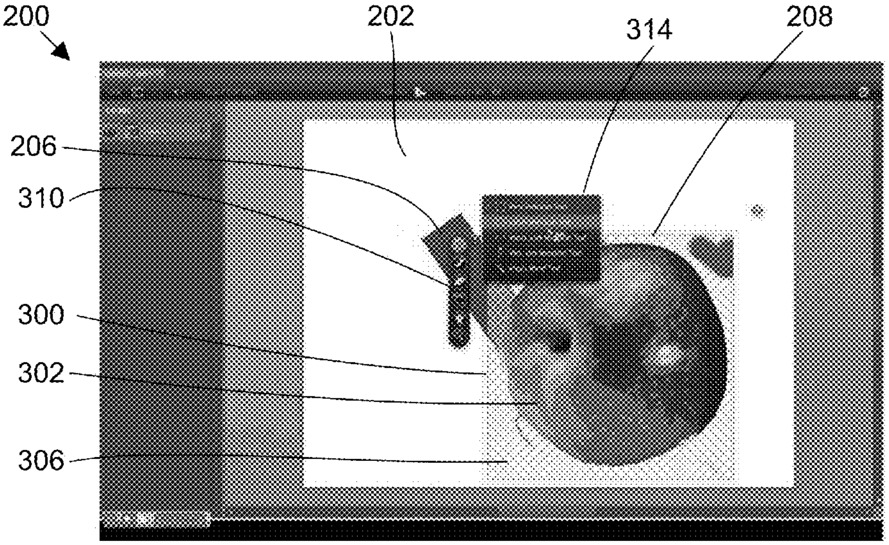

FIGS. 3A-C are screen shots illustrating the exemplary user interface of the vector graphic editing application of FIGS. 2A-B in a bitmap editing mode. Here the bitmap editing mode displays a bitmap editing area 300 that displays a bitmap 302 for editing and a background pattern 304 that visually identifies the boundaries of the bitmap editing area 300. FIG. 3B and FIG. 3C illustrate exemplary controls 312, 314 that can be used in bitmap editing mode. One exemplary control is a selection tool allowing selection of a portion of a bitmap using, as examples, a selection circle, rectangle, lines, etc. Another exemplary control is a brush tool for drawing or otherwise adding to the bitmap. Other exemplary tools include, but are not limited to, an eraser for erasing part of the bitmap, and a hand tool for moving or zooming bitmaps.

While in a bitmap editing mode, the editing application may allow some or all the vector editing features to be used. For example, the editing application may facilitate resizing and cropping a bitmap container 208 even while within the bitmap editing mode in which a bitmap 302 contained in the bitmap container 208 is being edited. Similarly, the editing application may allow the bitmap container 208 to be moved around, resized, or otherwise changed. In certain embodiments the editing application will prevent or restrict features outside of the bitmap editing mode. For example, the editing application may prevent editing of other outside objects (e.g., vector graphic 206) to keep the user in the context of editing the selected bitmap container 208 and avoid overwhelming a user with the presentation of too many tools or other features.

Offering both vector and bitmap modes may involve offering tools for both modes that behave the same way. If a vector warp tool and a bitmap warp tool are similar, a user only has to learn one approach to warping. Generally, some editing features may be available to use on both a bitmap graphic and a bitmap container. For example, both a bitmap graphic and its bitmap container may be separately rotated, which can provide a user with significant flexibility with respect to how content is organized.

An editing application can provide filters used to edit the appearance of both vector and bitmap based graphics. Similar filters can be made available for both to provide consistency to the user. Generally, when in a vector or outer editing mode, a white filter can be used that changes the image so it is hard to edit the image. However, because the filter is applied at the outer level, when the user enters the bitmap editing mode, that filter can be removed to allow the user to more easily edit the graphic. When the user returns to the outer editing mode, the filter is again applied. In one exemplary embodiment, outer context filters are removed but outer transformations are maintained so that the user has a proper context for editing but without unnecessary distortion that might be presented by the filters. In some circumstances, it could be useful to maintain a filter and accordingly filters may be displayed or not at a user's option.

Figure 4A:
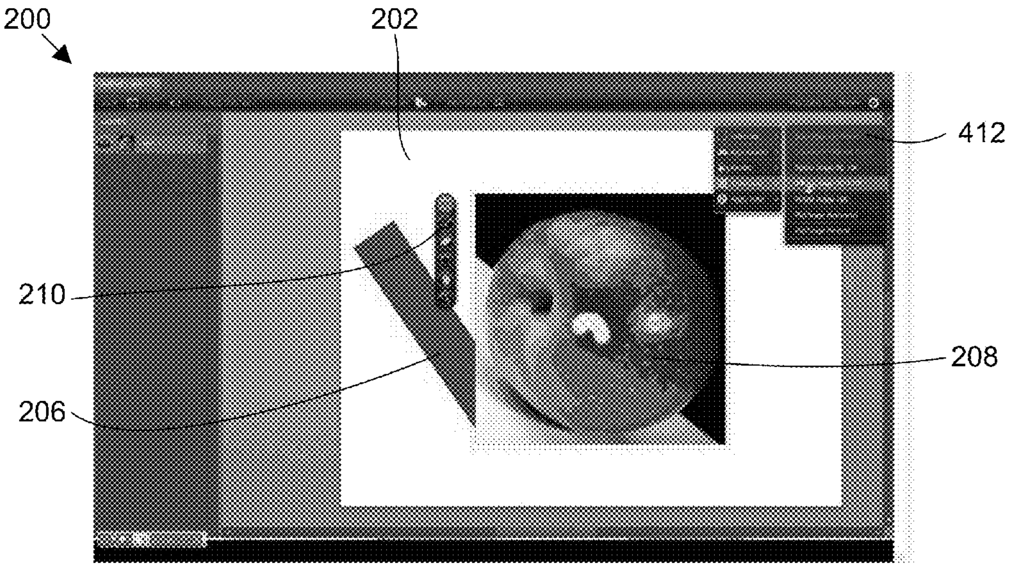
FIGS. 4A-C are screen shots illustrating the exemplary user interface of the vector graphic editing application of FIGS. 2A-B, according to certain embodiments.
Figure 4B:
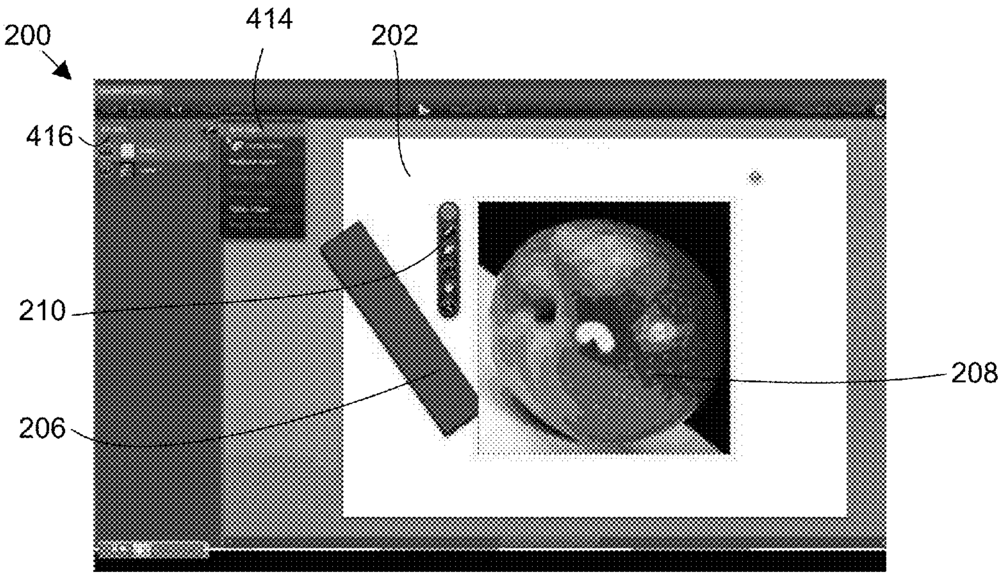
Figure 4C:
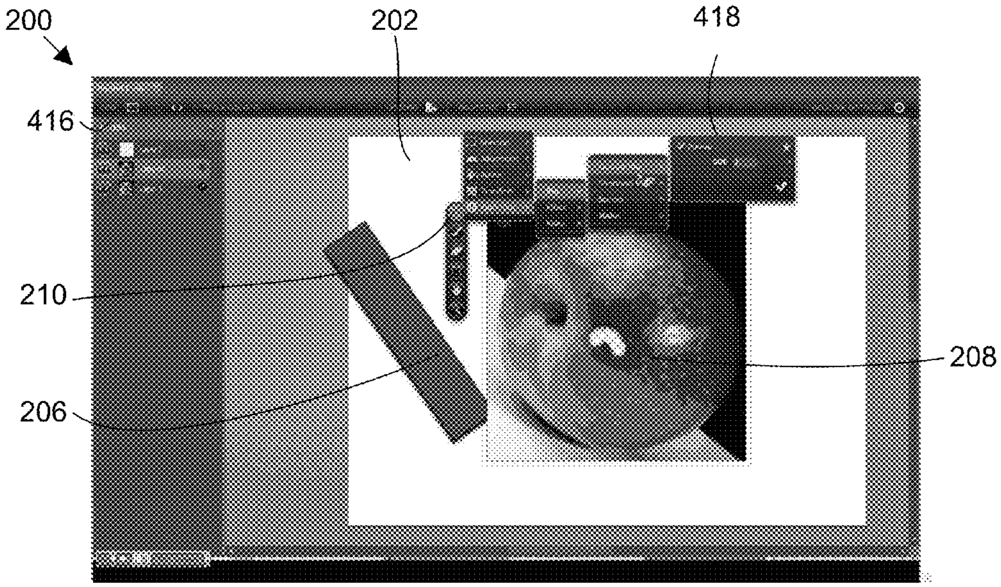

FIGS. 4A-C are screen shots illustrating the exemplary user interface 200 of the vector graphic editing application of FIGS. 2A-B. The user interface 200 has returned to the outer editing environment after leaving the bitmap editing mode of FIGS. 3A-C. The user interface 200 presents various controls 412, 414 and filter 418 for editing the outer editing level graphics including vector graphic 206 and bitmap container 208.

Figure 5A:
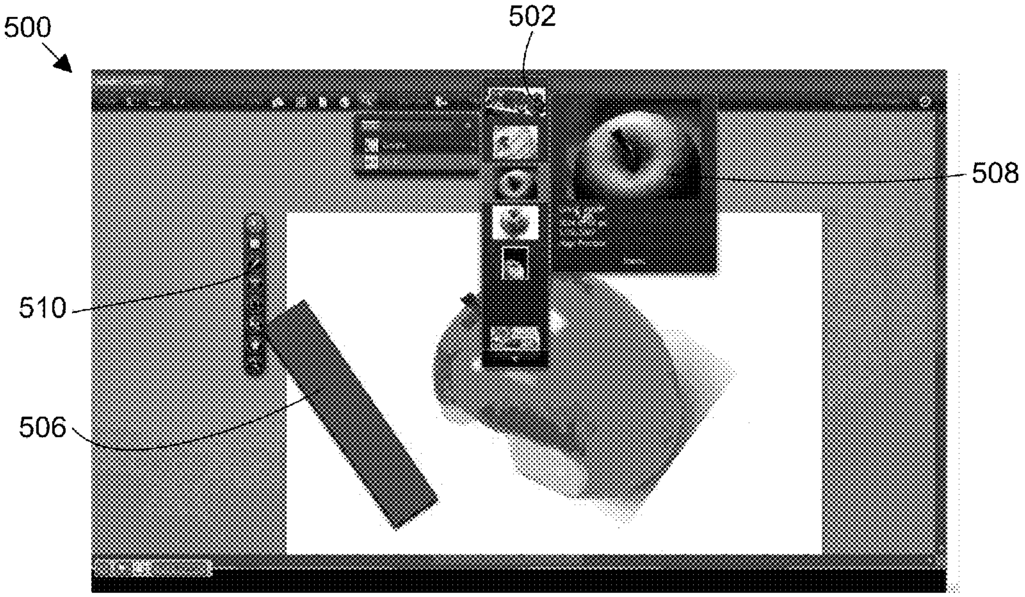
FIGS. 5A-B are screen shots illustrating another exemplary user interface of an editing application, according to certain embodiments.
Figure 5B:
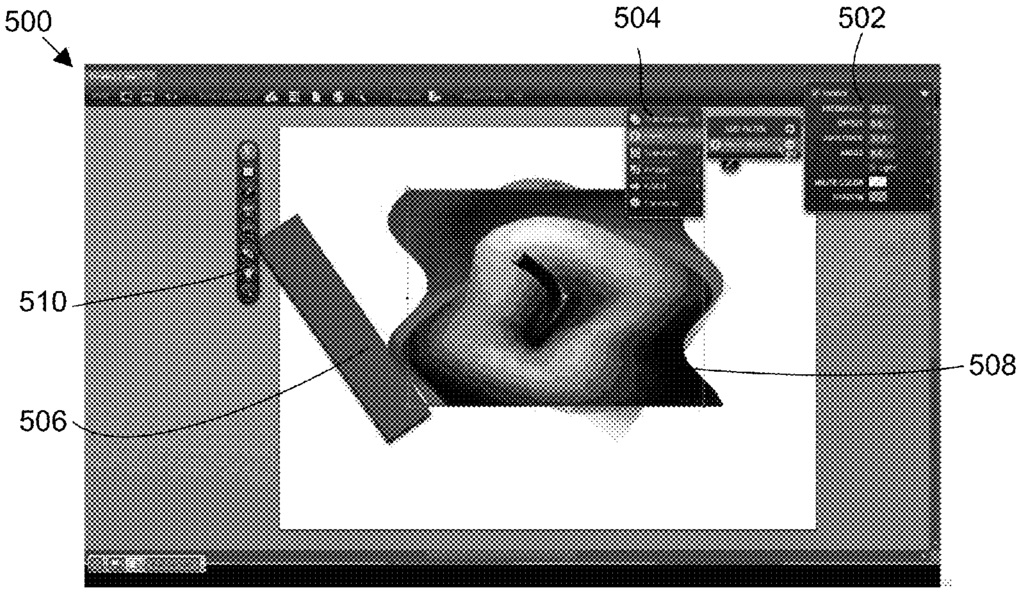

FIGS. 5A-B are screen shots illustrating another exemplary user interface 500 of an editing application, according to certain embodiments. In this example, the user inserts a green apple bitmap 508 using an insert image feature 502, as shown in FIG. 5A. The user next applies a filter to a bitmap container containing the green apple bitmap 508 using a filter menu 502. The user could subsequently edit the green apple bitmap 508 by entering a bitmap editing mode in which the filter is no longer applied.

Figure 6:
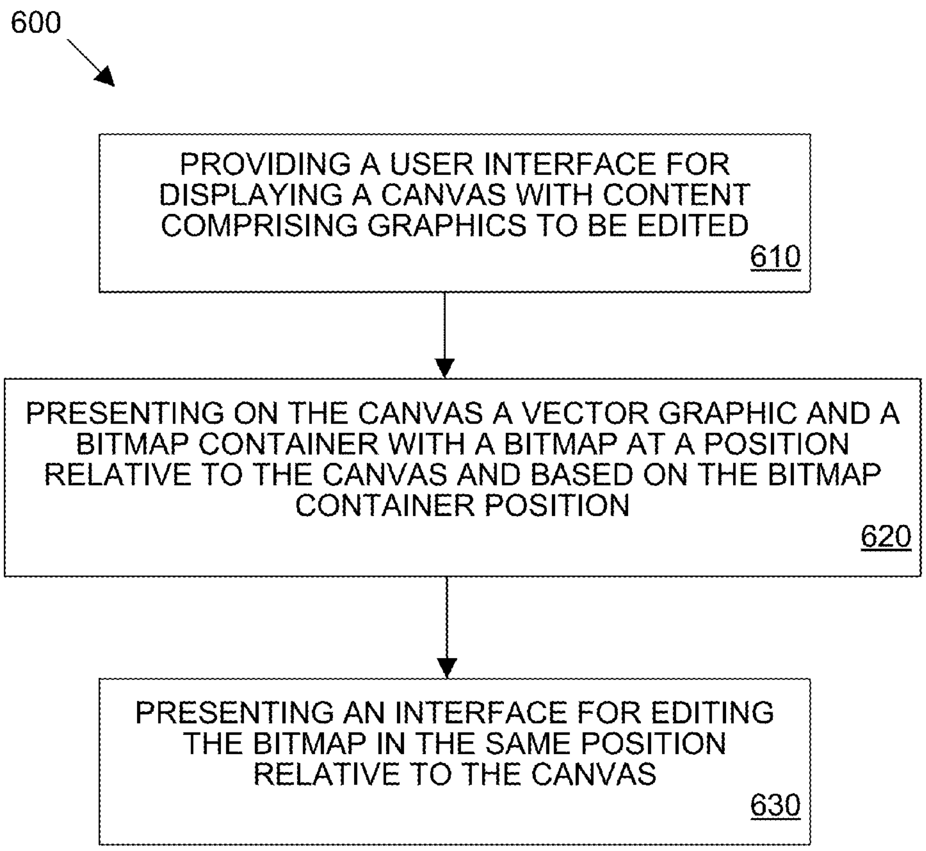
FIG. 6 is a flow chart illustrating an exemplary method of providing an editing application for editing both vector and bitmap graphics, according to certain embodiments.

FIG. 6 is a flow chart illustrating an exemplary method 600 of providing an editing application for editing both vector and bitmap graphics, according to certain embodiments. The editing application 14 of FIG. 1 provides an exemplary application on an exemplary computing environment 5 in which the method 600 could be performed.

The method 600 comprises providing a user interface for displaying a canvas with content comprising graphics to be edited, as shown in block 610. Such a user interface, as an example, could be provided by the editing application 14 depicted in FIG. 1.

The method 600 further comprises presenting on the canvas a vector graphic and a bitmap container, the bitmap container including a bitmap at a position relative to the canvas and based on the bitmap container position, as shown in block 620.

In one exemplary embodiment, an editing application is implemented using object-oriented or other application creation techniques that utilize inheritance or sub-classing. In one embodiment, graphical objects created, displayed, and edited on an editing canvas of the editing application can all be associated with the same base class. Associating different types of displayed objects with the same base class allows the application to reuse elements of that base class for the various features implemented by the editing application. Such reuse can save time in development of the editing application and can encourage similarity amongst the different types of displayed objects.

An editing application can be created using a common base class for both vector graphics and bitmap graphics. As examples, both vector graphics and bitmap container objects usable on the editing canvas of the editing application may inherit from a base editing object. The editing application's features for editing the vector graphics and bitmap containers can thus be implemented by at least some common functions (e.g., for resizing, applying effects, responding to events, etc.). This can provide various advantages and make possible or otherwise facilitate the use of vector and bitmap graphics on the same editing canvas. For example, a base class for a basic editing objects may include functionality for receiving events associated with user interaction with an editing application's interface, including, but not limited to, functionality for receiving and processing key events, mouse events, and update events.

In a particular example, a bitmap container can be implemented as a subclass of a base editing object and thus utilize editing features provided by the base editing object, e.g., features for maintaining multiple bitmap layers which are blended together. Using a bitmap container that inherits at least some of the elements of base editing object can also facilitate various editing features described in this disclosure. For example, an editing application user may rotate a bitmap container on the editing canvas and then enter a bitmap editing mode to edit the bitmap itself. The bitmap editing mode can display the bitmap in its rotated orientation for editing in that orientation, i.e., rotated based on the bitmap container's rotation. Implementing the bitmap editing mode in the editing application can be simplified by the bitmap container inheriting elements of the base editing object. In the present example, the editing portion of this image container can use the key/mouse and update events to control editing of the image in its rotated orientation. In particular, it may use mouse events with corrected local coordinates to facilitate editing of the bitmap in its rotated orientation. In contrast, allowing effects and transformations that are applied to a bitmap (e.g., via a bitmap container) while the bitmap is edited may otherwise necessitate creation of specific and possibly inconsistent functionality. It should be noted, however, that embodiments need not utilize a base class, inheritance, or bitmap containers to provide some of the benefits described in this disclosure. Accordingly, while certain specific implementations may provide certain benefits it will be recognized that various features can be omitted or provided in alternative ways to achieve the same or alternative functionality as may be required by an editing application.

The method 600 further comprises presenting an interface for editing the bitmap in the same position relative to the canvas, as shown in block 630. This may occur in response to receiving a command or other input to edit the bitmap. The vector graphic may be displayed on the canvas while the interface for editing the bitmap is presented to preserve the context of the entire piece of content for the user. One or more transformations and/or filters applied to the bitmap container may or may not be applied to the bitmap container (and thus the bitmap position and appearance) while the interface for editing the bitmap is presented, i.e., while the application is in bitmap editing mode.

The user interface may provide a variety of filters and other controls for editing both the vector graphics and the bitmap. The vector filters and controls may be applied to bitmap container objects. Filters and controls may also be applied to the bitmaps themselves while the application is in bitmap editing mode.

Another exemplary embodiment provides a scale pixels to screen option. A large bitmap may be too big for a piece of content and may be resized to fit better. A scale pixels to screen option allows a user to optionally drop unneeded resolution information. This capability can facilitate the ability of an editing application to edit to different output formats, including animations, printing, and PDF formats.

General

Numerous specific details are set forth herein to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing platform, such as one or more computers or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components or systems. It should be appreciated that such communications may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:

providing, via a processor, an application for editing computer content comprising graphics, wherein the application provides a user interface comprising a canvas for displaying content being edited;

presenting, via the processor, on the canvas a vector graphic and a bitmap container, the bitmap container comprising a bitmap that is at least partially displayed in a position relative to the canvas and based on a bitmap container position; and in response to receiving input to edit the bitmap, presenting, via the processor, an interface for editing the bitmap in the position relative to the canvas, wherein the vector graphic is displayed on the canvas while the interface for editing the bitmap is presented, wherein, if a transformation is applied to the bitmap container changing the position of the bitmap relative to the canvas to a changed position, the interface for editing the bitmap presents the bitmap in the changed position.

2. The method of claim 1 wherein both the vector graphic and the bitmap container inherit functionality from a base editing object, the functionality used to receive events associated with user interaction with the interface presented for editing the bitmap.

3. The method of claim 2 wherein the functionality receives and processes mouse events with corrected local coordinates.

4. The method of claim 1 further comprising, while the interface for editing the bitmap is presented:

receiving input to perform a transformation on the bitmap container; and in response, transforming the bitmap container.

5. The method of claim 1 wherein, prior to receiving the input to edit the bitmap, a filter is applied to the bitmap container; and when the interface for editing the bitmap is presented, the filter is not applied.

6. The method of claim 1 wherein the user interface provides a same filter type for application to both the bitmap container and the bitmap.

7. The method of claim 1 wherein the interface for editing the bitmap comprises a visual identifier for distinguishing empty areas of the bitmap from surrounding areas of content in the canvas.

8. The method of claim 1 wherein the user interface presents an option to scale pixel resolution of the bitmap based on the bitmap's size on the canvas.

9. A computer apparatus comprising:

a user interface of an application for editing computer content comprising graphics, wherein the user interface displays a canvas for editing content being edited;

a vector graphics editor for presenting on the canvas one or more vector graphics and one or more bitmap containers, the bitmap containers comprising bitmaps that are at least partially displayed in positions relative to the canvas and based on the bitmap containers' positions;

a bitmap graphics editor presenting an interface for editing bitmap in their same positions relative the canvas; and a processor configured to interpret computer-readable instructions to provide the user interface, the vector graphics editor, and the bitmap graphics editor, wherein the bitmap position is maintained when the interface for editing the bitmap is presented even if a transformation was applied to an associated bitmap container.

10. The computer apparatus of claim 9 wherein, while the interface for editing the bitmap is presented, the vector graphic editor use is restricted to allow transformation of a bitmap container associated with a bitmap being edited by the bitmap graphics editor but of no other object on the canvas.

11. The computer apparatus of claim 9 wherein a filter applied to a bitmap container is not applied when the interface for editing the bitmap is presented.

12. The computer apparatus of claim 9 wherein the user interface presents an option to scale pixel resolution of a bitmap based on the bitmap's size on the canvas.

13. A non-transitory computer-readable medium on which is encoded program code, the program code comprising:

program code for providing an application for editing computer content comprising graphics, wherein the application provides a user interface comprising a canvas for displaying content being edited;

program code for presenting on the canvas a vector graphic and a bitmap container, the bitmap container comprising a bitmap that is at least partially displayed in a position relative to the canvas and based on a bitmap container position; and program code for, in response to receiving input to edit the bitmap, presenting an interface for editing the bitmap in the position relative to the canvas, wherein the vector graphic is displayed on the canvas while the interface for editing the bitmap is presented, wherein, if a transformation is applied to the bitmap container changing the position of the bitmap relative to the canvas to a changed position, the interface for editing the bitmap presents the bitmap in the changed position.

14. The computer-readable medium of claim 13 further comprising, while the interface for editing the bitmap is presented, program code receives input to perform a transformation on the bitmap container and, in response, transforms the bitmap container.

15. The computer-readable medium of claim 13 wherein the user interface provides a same filter type for application to both the bitmap container and the bitmap.

16. The computer-readable medium of claim 13 wherein both the vector graphic and the bitmap container inherit functionality from a base editing object, the functionality used to receive events associated with user interaction with the interface presented for editing the bitmap.

17. The computer-readable medium of claim 16 wherein the functionality receives and processes mouse events with corrected local coordinates.

* * * * *